United States Patent
Chen

(10) Patent No.: US 11,128,818 B2
(45) Date of Patent: Sep. 21, 2021

(54) THERMAL IMAGE PROCESSING SYSTEM AND METHOD

(71) Applicant: Wistron Corporation, New Taipei (TW)

(72) Inventor: Hong Siou Chen, New Taipei (TW)

(73) Assignee: Wistron Corporation, New Taipei (TW)

(*) Notice: Subject to any disclaimer, the term of this patent is extended or adjusted under 35 U.S.C. 154(b) by 731 days.

(21) Appl. No.: 15/860,480

(22) Filed: Jan. 2, 2018

(65) Prior Publication Data

US 2019/0182439 A1 Jun. 13, 2019

(30) Foreign Application Priority Data

Dec. 12, 2017 (TW) ................................ 106143451

(51) Int. Cl.
| | |
|---|---|
| *H04N 5/232* | (2006.01) |
| *H04N 5/33* | (2006.01) |
| *G06T 7/13* | (2017.01) |
| *G06T 7/194* | (2017.01) |
| *G01J 5/00* | (2006.01) |
| *H04N 5/369* | (2011.01) |

(52) U.S. Cl.
CPC ................ *H04N 5/332* (2013.01); *G01J 5/00* (2013.01); *G06T 7/13* (2017.01); *G06T 7/194* (2017.01); *H04N 5/23229* (2013.01); *G01J 2005/0077* (2013.01); *G06T 2207/10024* (2013.01); *G06T 2207/10048* (2013.01); *G06T 2207/20221* (2013.01); *H04N 5/3696* (2013.01)

(58) Field of Classification Search
None
See application file for complete search history.

(56) References Cited

U.S. PATENT DOCUMENTS

| | | | |
|---|---|---|---|
| 2012/0163657 A1 | 6/2012 | Shellshear | |
| 2014/0062981 A1* | 3/2014 | Huang | G09G 3/3648 345/211 |
| 2019/0098230 A1* | 3/2019 | Lovemelt | H04N 5/265 |

FOREIGN PATENT DOCUMENTS

CN 107729907 A 2/2018

OTHER PUBLICATIONS

Bhowmik et al., "Optimum Fusion of Visual and Thermal Face Images for Recognition", 2010 Sixth International Conference on Information Assurance and Security. (Year: 2010).*
Bhowmik, "Optimum Fusion of Visual and Thermal Face Images for Recognition" (Year: 2010).*
Office Action dated Dec. 21, 2018 in corresponding Taiwan Patent Application No. 106143451.
Office Action dated May 13, 2020 in corresponding Chinese Patent Application No. 201711393663.4.

* cited by examiner

*Primary Examiner* — Eileen M Adams
(74) *Attorney, Agent, or Firm* — Donald E. Stout; Stout, Uxa & Buyan, LLP

(57) ABSTRACT

A thermal image processing system and method includes capturing a visual image and a thermal image of a subject under test; fusing the visual image with the thermal image to result in a fused image, followed by determining an area of the subject under test in the fused image and accordingly obtaining subject temperature of the subject under test.

17 Claims, 9 Drawing Sheets

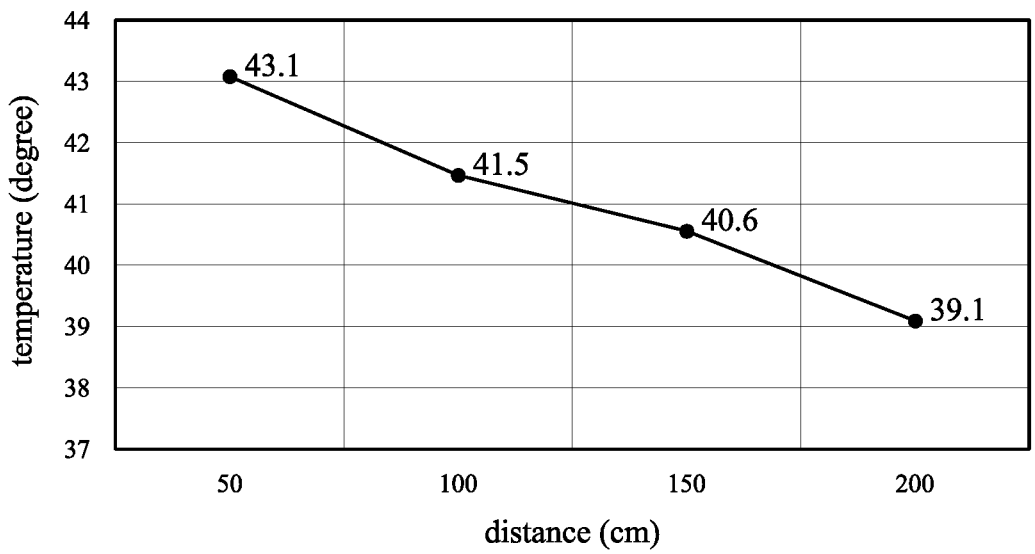
FIG. 1
(Prior art)
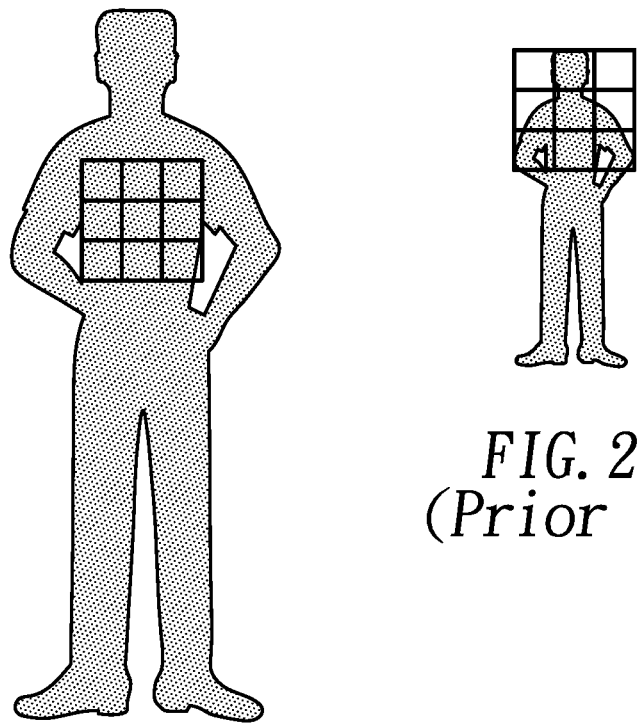
FIG. 2B
(Prior art)
FIG. 2A
(Prior art)

background temperature $T_{B1}$ in A1
subject temperature $T_{O1}$ of O1
temperature T of thermal pixel A1 background temperature $T_{B3}$ in A3
subject temperature $T_{O3}$ of O3
temperature T of thermal pixel A3 background temperature $T_{G1}$ in A1
subject temperature $T_{OA1}$ of $O_{A1}$
subject temperature $T_{OB1}$ of $O_{B1}$
temperature T of thermal pixel A1

THERMAL IMAGE PROCESSING SYSTEM AND METHOD

CROSS-REFERENCE TO RELATED APPLICATIONS

This application claims priority of Taiwan Patent Application No. 106143451, filed on Dec. 12, 2017, the entire contents of which are hereby incorporated by reference.

BACKGROUND OF THE INVENTION

1. Field of the Invention

The present disclosure generally relates to image processing, and more particularly to a thermal image processing system and method.

2. Description of Related Art

A camera is one of basic instruments equipped in smartphones, and is commonly used to sense visible light of wavelengths between 400 nanometers and 700 nanometers. In order to increase the sensing range to expand applications, some smartphones are equipped with an infrared sensor to sense infrared light of wavelengths between 700 nanometers and 1000 micrometers.

In general, an object having higher temperature will emit more infrared light. The temperature detected by a smartphone equipped with an infrared camera is decreasing when the detecting distance is increasing, therefore raising temperature error. FIG. 1 shows an exemplary curve demonstrating relation between detected temperature and detecting distance.

The number of pixels of an infrared sensor of an infrared camera equipped in modern smartphones is very small (e.g., thousands of pixels), which is far smaller than the number (e.g., millions or even ten millions) of pixels of a visible-light camera equipped in the smartphones. As the resolution of the infrared camera is low, a single pixel may probably cover background in addition to a detected object when the detecting distance becomes large. As a result, the temperature detected by the pixel is substantially reduced with more temperature error for the reason that the temperature of detected object and the temperature of background are averaged. FIG. 2A shows a schematic diagram exemplifying detecting a near subject by using an infrared sensor with 3×3 pixels, and FIG. 2B shows a schematic diagram exemplifying detecting a far subject by using the same infrared sensor with 3×3 pixels. As shown in the figures, when the detected subject is near (FIG. 2A), the pixels of the infrared sensor cover only the detected subject. However, when the detected subject is far (FIG. 2B), the pixels of the infrared sensor additionally cover the background, therefore decreasing the detected temperature with more temperature error.

Therefore, a need has arisen to propose a novel infrared camera for overcoming disadvantages of the infrared camera equipped in the conventional smartphones.

SUMMARY OF THE INVENTION

In view of the foregoing, it is an object of the embodiment of the present disclosure to provide a thermal image processing system and method capable of effectively improving measurement and enhancing accuracy of a thermal image without increasing the number of pixels in an infrared sensor.

According to one embodiment, a thermal image processing system includes an image capture device and a processor. The image capture device captures a visual image and a thermal image of a subject under test. The processor fuses the thermal image with the visual image to result in a fused image, and determines an area of the subject under test and accordingly obtains subject temperature of the subject under test.

BRIEF DESCRIPTION OF THE DRAWINGS

FIG. 1 shows an exemplary curve demonstrating relation between detected temperature and detecting distance;

FIG. 2A shows a schematic diagram exemplifying detecting a near subject by using an infrared sensor with 3×3 pixels;

FIG. 2B shows a schematic diagram exemplifying detecting a far subject by using the same infrared sensor with 3×3 pixels;

DETAILED DESCRIPTION OF THE INVENTION

Figure 3:
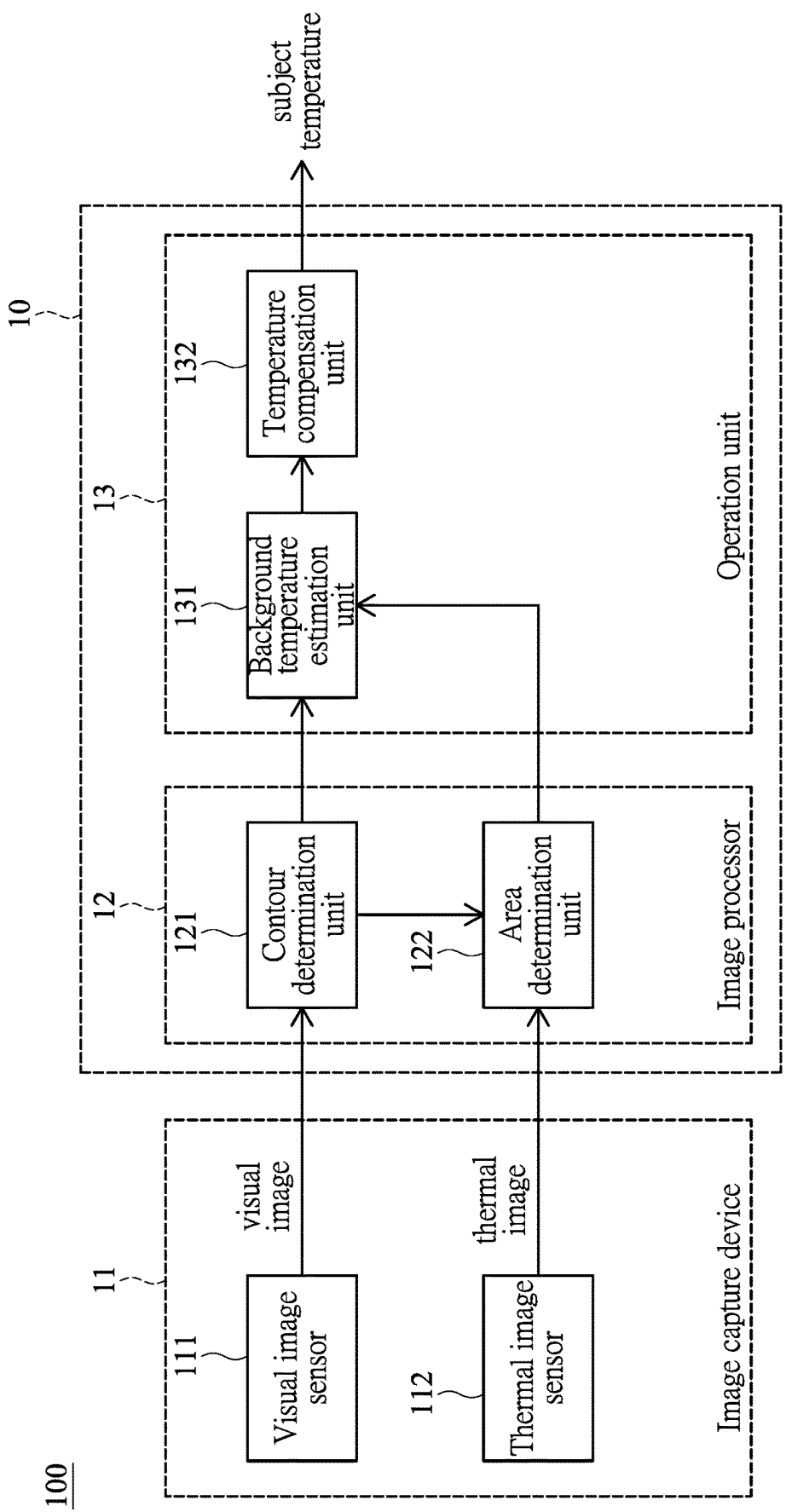
FIG. 3 shows a block diagram illustrating a thermal image processing system according to one embodiment of the present disclosure.
Figure 4:
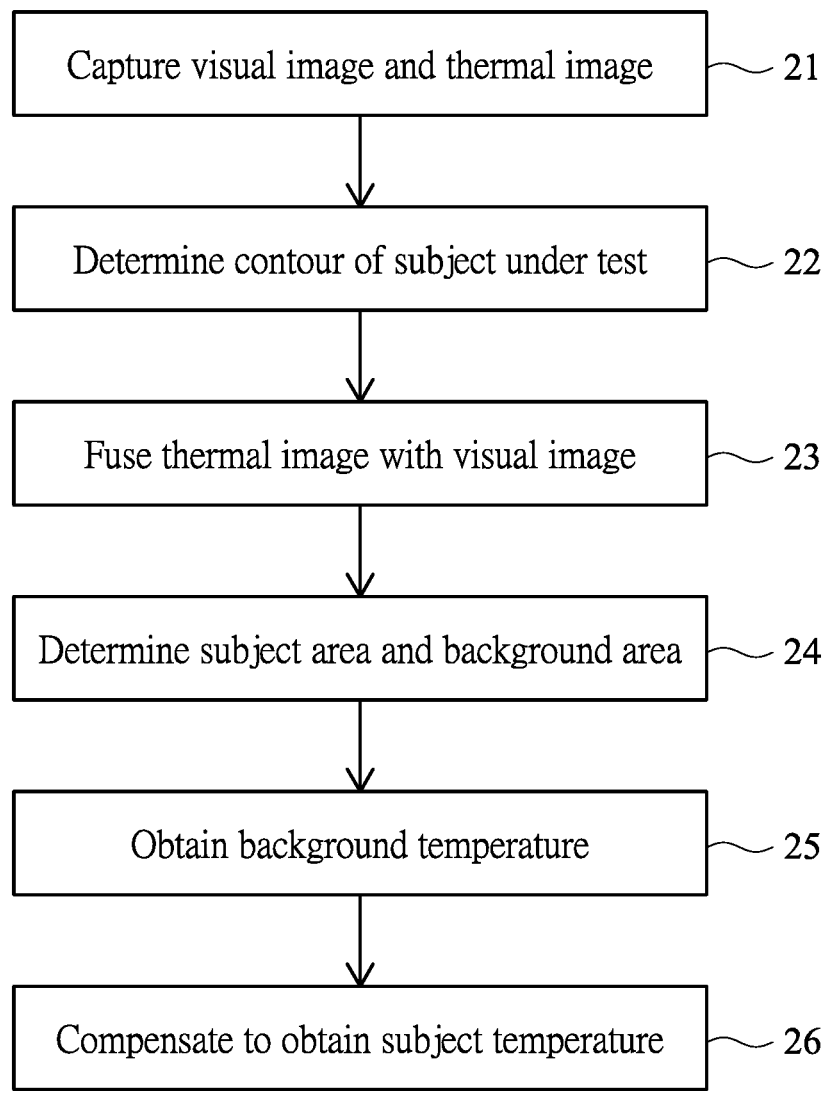
FIG. 4 shows a flow diagram illustrating a thermal image processing method according to one embodiment of the present disclosure.

FIG. 3 shows a block diagram illustrating a thermal image processing system 100 according to one embodiment of the present disclosure, and FIG. 4 shows a flow diagram illustrating a thermal image processing method 200 according to one embodiment of the present disclosure. The blocks of FIG. 3 may be implemented by using hardware, software or their combination.

The embodiment may be adaptable to mobile devices such as smartphones for effectively improving measurement and enhancing accuracy of a thermal image.

In the embodiment, the thermal image processing system 100 may include an image capture device 11, which may include a visual image sensor 111 and a thermal image sensor 112 configured to respectively capture a visual image and a thermal image of at least one subject under test (step 21). In one embodiment, the visual image sensor 111 and the thermal image sensor 112 may be independent devices, respectively. In another embodiment, however, the visual image sensor 111 and the thermal image sensor 112 may be integrated, for example, by embedding pixels of the thermal image sensor 112 among pixels of the visual image sensor 111.

Figure 5A:
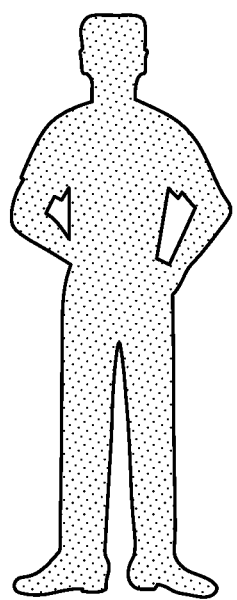
FIG. 5A shows an exemplary visual image with high resolution.
Figure 5B:
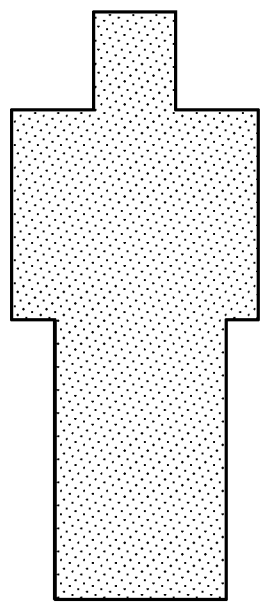
FIG. 5B shows an exemplary thermal image with low resolution.

In the embodiment, resolution of the visual image is substantially higher than resolution of the thermal image. For example, the visual image sensor 111 (e.g., a color camera) has five mega (=2560×1920) visual pixels, and the thermal image sensor 112 (e.g., an infrared camera) has 2400 (=60×40) thermal pixels. FIG. 5A shows an exemplary visual image with high resolution of a subject (e.g., a person) under test, and FIG. 5B shows an exemplary thermal image with low resolution of the same subject under test. In the specification, "high" or "low" is an adjective describing the resolution of the visual image against the resolution of the thermal image.

In the embodiment, the thermal image processing system 100 may include a processor 10 coupled to receive and process the visual image and the thermal image. The processor 10 of the embodiment may include an image processor 12 and an operation unit 13, where the image processor 12 may include a contour determination unit 121 configured to determine a subject contour of the subject under test in the visual image (step 22).

Figure 6A:
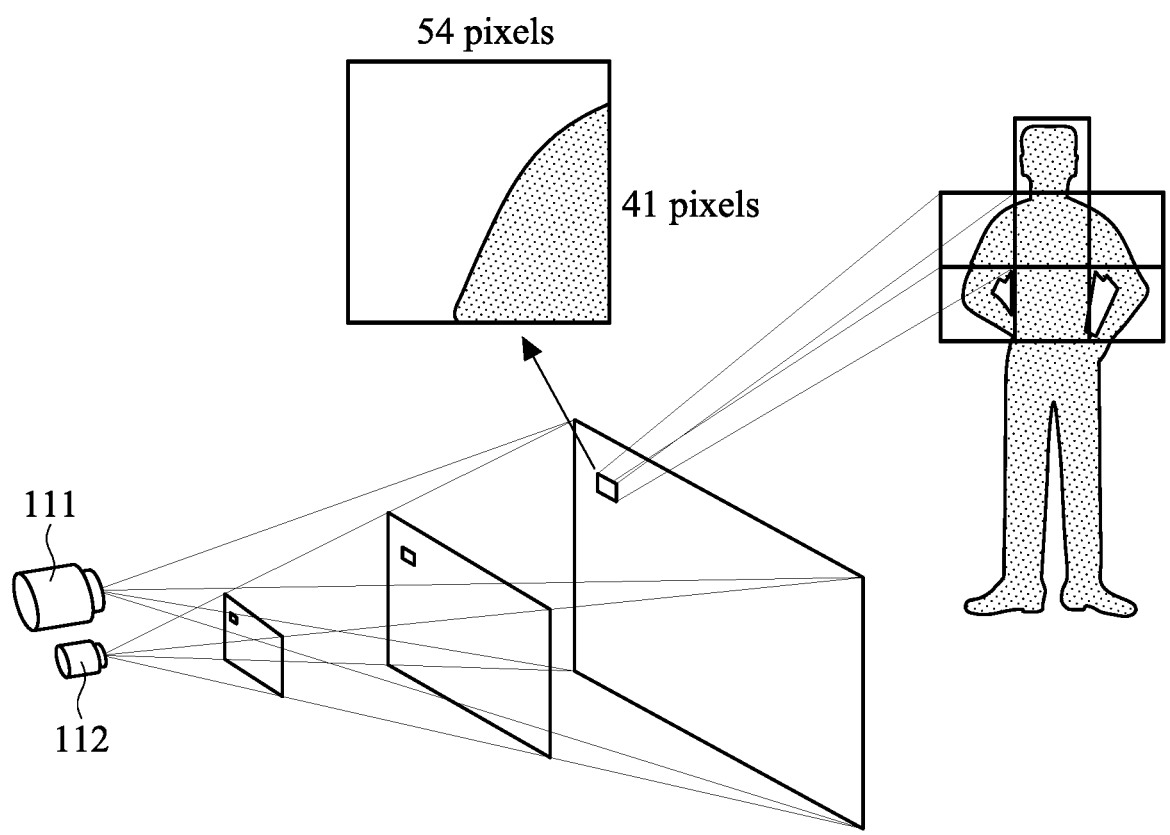
FIG. 6A shows a schematic diagram conceptually illustrating fusing a thermal image with a visual image.
Figure 6B:
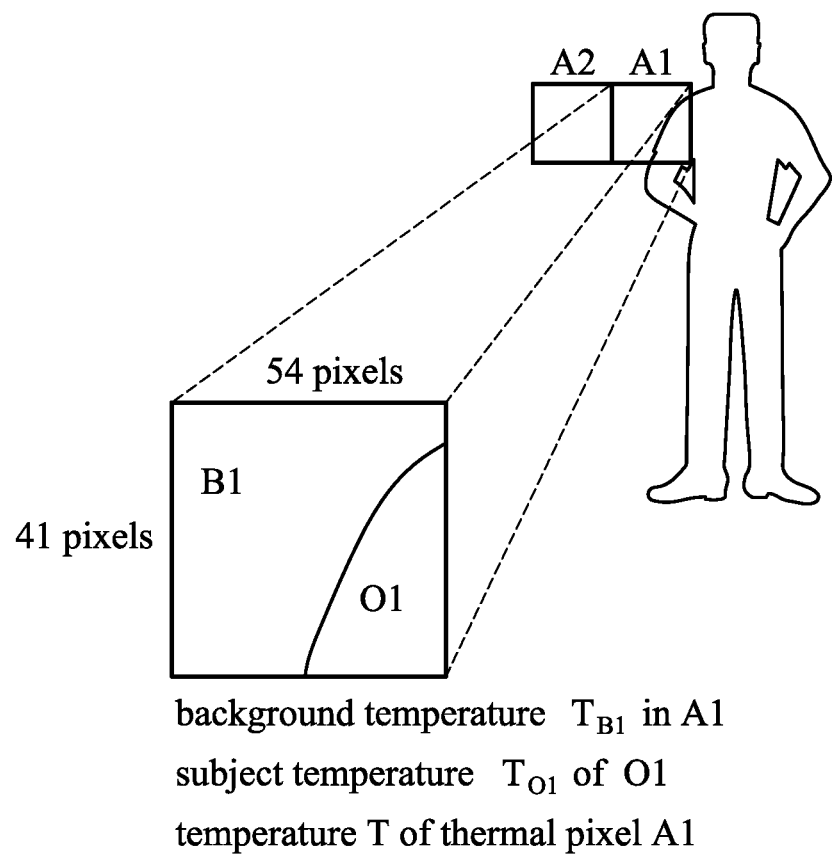
FIG. 6B exemplifies fusing the thermal image with the visual image.

The image processor 12 may also include an area determination unit 122 configured first, in step 23, to fuse the thermal image with the visual image (with the determined subject contour) to result in a fused image by using an image fusion technique. The fused image contains not only visual information but also corresponding temperature information. As the resolution of the visual image is substantially higher than the resolution of the thermal image, each thermal pixel thus corresponds to a plurality of visual pixels. FIG. 6A shows a schematic diagram conceptually illustrating fusing a thermal image with a visual image. FIG. 6B exemplifies fusing the thermal image with the visual image (with the subject contour), where A1 and A2 represent two thermal pixels in the thermal image. In the example shown in FIG. 6B, the thermal pixel A1 of the thermal image is fused with 54×41 visual pixels. In general, when the thermal image is fused with the visual image, common reference points of the thermal image and the visual image are first determined, followed by deciding a scaling ratio between the thermal image and the visual image according to their view angles. Accordingly, image fusion of the thermal image and the visual image is performed. In the pertinent field of the disclosure, the term "pixel" may refer to a sensing unit of a (visual/thermal) image sensor or may refer to an image point in a (visual/thermal) image. In the embodiment, a pixel of the image sensor may correspond to a pixel of the image.

Subsequently, in step 24, the area determination unit 122 is configured to determine a subject area (corresponding to the subject under test) as exemplified by O1 (FIG. 6B) and a background area (corresponding to area other than the subject under test) as exemplified by B1 (FIG. 6B) in a thermal pixel. In the embodiment, the subject contour defines a subject region, visual pixels within which are counted as the subject area. A region excluding the subject region defines a background region, visual pixels within which are counted as the background area.

In the embodiment, the operation unit 13 may include a background temperature estimation unit 131 configured to obtain background temperature (step 25). In one example, the thermal image sensor 112 is utilized to additionally capture a thermal image containing no subject under test, and temperature of one thermal pixel (or average temperature of plural thermal pixels) of the additionally captured thermal image is used as the background temperature. In the specification, temperature of a thermal pixel refers to the temperature measured or detected by the thermal pixel. In another example, one thermal pixel (e.g., A2 in FIG. 6B) not containing the subject under test of the aforementioned thermal image (containing the subject) is used as the background temperature $T_{B1}$. It is appreciated that the background temperature estimation unit 131 of the operation unit 13 is optional. The background temperature may be provided from devices or methods other than the thermal image processing system 100 or the thermal image processing method 200.

The operation unit 13 of the embodiment may include a temperature compensation unit 132 configured to compensate temperature T of a thermal pixel (e.g., A1 in FIG. 6B) according to the subject area O1 (generated by the area determination unit 122), the background area B1 and the background temperature $T_{B1}$, therefore obtaining subject temperature $T_{O1}$ of the subject (step 26).

According to characteristics of the thermal image sensor 112, temperature of a thermal pixel is proportional to pixel area. Specifically, areas associated with the subject temperature $T_{O1}$ and the background temperature $T_{B1}$ contribute to the temperature T of the thermal pixel. That is, a weighted sum of the subject temperature $T_{O1}$ and the background temperature $T_{B1}$ with weights of corresponding area percentage is equal to the temperature T of the thermal pixel, and may be expressed as follows:

$$T=(B1*T_{B1}+O1*T_{O1})/(B1+O1) \quad (1)$$

$$\text{or } T_{O1}=(T*(B1+O1)-B1*T_{B1})/O1 \quad (2)$$

In general, subject temperature $T_O$ may be expressed as follows:

$$T_O=(T*(B+O)-B*T_B)/O \quad (3)$$

where T represents temperature of a thermal pixel, B represents a background area, O represents a subject area, and $T_B$ represents background temperature.

In one example, temperature T of the thermal pixel A1 (FIG. 6B) is 40 degrees. After image fusion, each thermal pixel corresponds to 2214 visual pixels, among which the subject area O1 includes 886 visual pixels and the background area B1 includes 1328 visual pixels in the thermal pixel A1. Suppose the background temperature $T_{B1}$ is 25 degrees, and according to the formula (2) the subject temperature $T_{O1}$ is:

$$T_{O1}=(40*(1328+886)-1328*25)/886=62.483$$

Figure 6C:
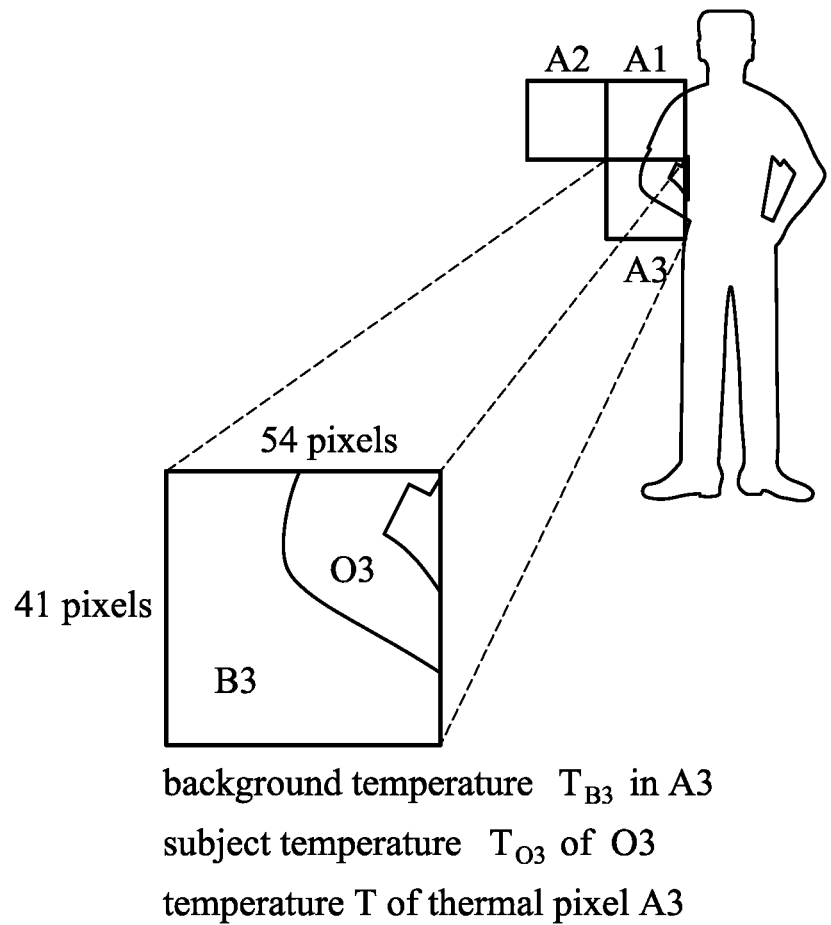
FIG. 6C exemplifies fusing the thermal image with the visual image.

In another example, as shown in FIG. 6C, temperature T of the thermal pixel A3 is 30 degrees. After image fusion, each thermal pixel corresponds to 2214 visual pixels, among which the subject area O3 includes 295 visual pixels and the background area B3 includes 1919 visual pixels in the thermal pixel A3. Suppose the background temperature $T_{B3}$ is 25 degrees, and according to the formula (2) the subject temperature $T_{O3}$ is:

$$T_{O3}=(30*(1919+295)-1919*25)/295=62.525$$

According to the embodiment, the measured temperature T (e.g., 40 degrees) of the thermal pixel A1 is compensated to obtain the subject temperature $T_{O1}$ (i.e., 62.483) that represents actual temperature of the subject, with a substantive percentage change of 56% (=(62.483−40)/40). Accordingly, the embodiment is capable of effectively improving measurement and enhancing accuracy of a thermal image. The scheme proposed above may be utilized to compensate temperature of every thermal pixel, particularly the thermal pixel that partially covers the subject.

Figure 7A:
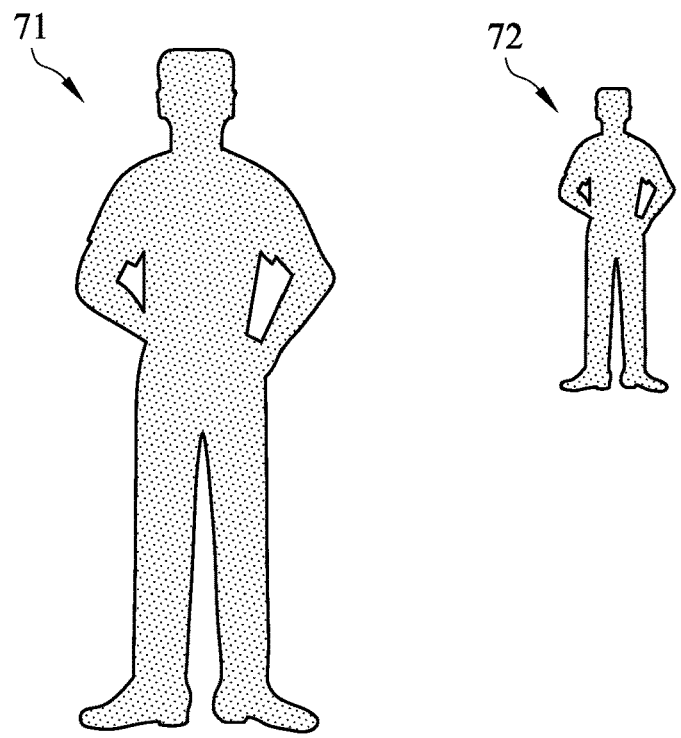
FIG. 7A shows an exemplary visual image containing two subjects under test.
Figure 7B:
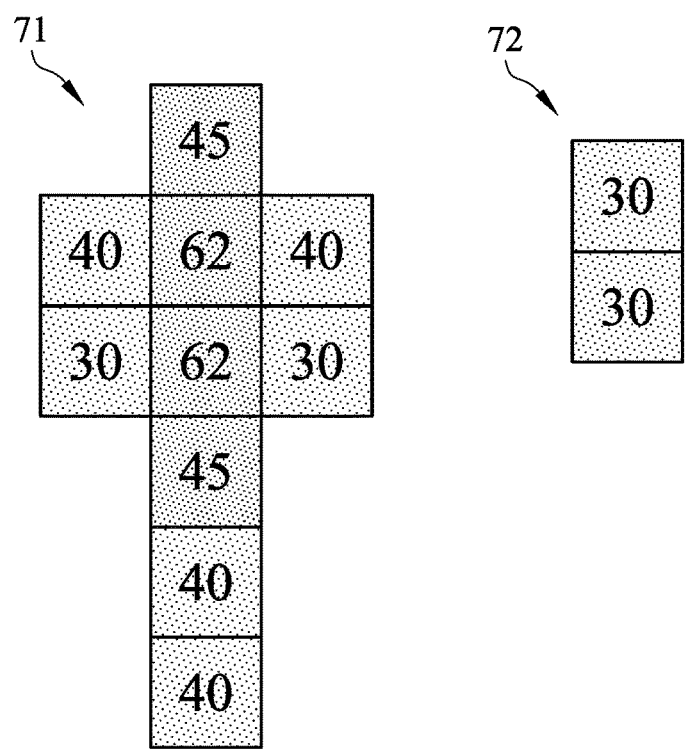
FIG. 7B shows an exemplary thermal image associated with FIG. 7A.

The embodiment as discussed above may be adaptable to a visual image containing plural subjects under test. FIG. 7A shows an exemplary visual image containing two subjects under test, left-side subject 71 of which is near the image capture device 11 and the right-side subject 72 of which is far from the image capture device 11. FIG. 7B shows an exemplary thermal image associated with FIG. 7A demonstrating temperature of thermal pixels associated with the subjects 71 and 72. As the left-side subject 71 is near the image capture device 11, the subject 71 is covered with more (e.g., ten) thermal pixels. To the contrary, as the right-side subject 72 is far from the image capture device 11, the subject 72 is covered with fewer (e.g., two) thermal pixels. Moreover, the thermal pixels of the right-side subject 72 cover background, therefore further reducing temperature corresponding the thermal pixels. After adopting the thermal image processing of the embodiment and the formula (3), the subject temperature of the subject 71/72 may be obtained by compensation. Further, if the subject 71 and the subject 72 have the same actual temperature, same subject temperature will be obtained for the subject 71 and the subject 72 no matter how far are the subjects 71 and 72 from the image capture device 11.

Figure 8:
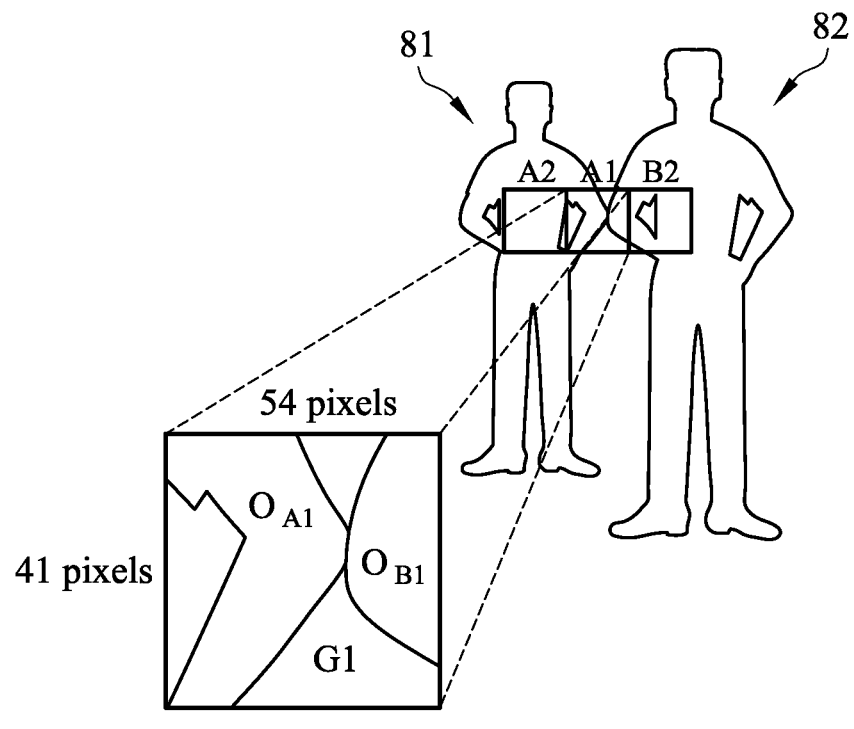
FIG. 8 exemplifies fusing the thermal image with the visual image containing two subjects under test.

The embodiment as discussed above may be adaptable to a visual image containing plural subjects under test with different temperatures. FIG. 8 exemplifies fusing the thermal image with the visual image containing two subjects under test. The left-side subject 81 is far from the image capture device 11, and the right-side subject 82 is near the image capture device 11. In this example, actual temperature (e.g., 62 degrees) of the left-side subject 81 is higher than actual temperature (e.g., 50 degrees) of the right-side subject 82. After adopting the thermal image processing of the embodiment and the formula (3), the subject temperature of the subject 81 and the subject temperature of the subject 82 may be obtained by compensation, respectively.

For example, regarding the thermal pixel A1, the subject area $O_{A1}$ of the left-side subject 81 includes 898 visual pixels, the subject area $O_{B1}$ of the right-side subject 82 includes 442 visual pixels, and the background area G1 includes 874 visual pixels. Suppose temperature distribution is continuous, and set the subject temperature of a subject with smaller subject area (e.g., setting subject temperature of $O_{B1}$ in this example) to a subject temperature in an adjacent thermal pixel covering only the same subject (e.g., $T_{B2}$ in the adjacent thermal pixel B2). The following formula (4) may be deduced from the formula (1):

$$T=(G1*T_{G1}+O_{A1}*T_{OA1}+O_{B1}*T_{OB1})/(O_{A1}+O_{B1}+G1) \quad (4)$$

Substitute the known values into the formula (4) to result in the following equation, from which the subject temperature $T_{OA1}$ (of 62 degrees) of the left-side subject 81 may be derived:

$$45=(874*25+898*T_{OA1}+442*50)/(898+874+442)$$

Although specific embodiments have been illustrated and described, it will be appreciated by those skilled in the art that various modifications may be made without departing from the scope of the present disclosure, which is intended to be limited solely by the appended claims.

What is claimed is:

1. A thermal image processing system, comprising:
an image capture device that captures a visual image and a thermal image of at least one subject under test; and
a processor that fuses the thermal image with the visual image to result in a fused image, and determines an area of the subject under test and accordingly obtains subject temperature of the subject under test;
wherein the processor comprises:
an image processor that determines a subject area and a background area in a single thermal pixel of the fused image; and
an operation unit that compensates temperature of the thermal pixel to obtain the subject temperature;
wherein a weighted sum of the subject temperature and background temperature with weights of corresponding area percentage is equal to temperature of the thermal pixel.

2. The system of claim 1, wherein the image capture device comprises a visual image sensor and a thermal image sensor that capture the visual image and the thermal image, respectively.

3. The system of claim 1, wherein the subject area corresponding to a region of the subject under test and the background area corresponding to a region other than the subject under test; and
the operation unit compensates the temperature of the thermal pixel according to the subject area, the background area and the background temperature.

4. The system of claim 3, wherein the image processor comprises:
a contour determination unit that determines a subject contour of the subject under test in the visual image; and
an area determination unit that fuses the thermal image with the visual image, and determines the subject area and the background area in the thermal pixel according to the subject contour.

5. The system of claim 3, wherein the operation unit comprises:
a background temperature estimation unit that determines the background temperature; and
a temperature compensation unit that obtains the subject temperature according to the subject area, the background area and the background temperature.

6. The system of claim 5, wherein the background temperature estimation unit determines the background temperature according to temperature of one thermal pixel or average temperature of plural thermal pixels of an additionally captured thermal image containing no subject under test.

7. The system of claim 5, wherein the background temperature estimation unit determines the background temperature according to temperature of one thermal pixel covering no subject under test of the thermal image.

8. The system of claim 3, wherein the subject temperature $T_o$ is expressed as follows:
$T_o=(T*(B+O)-B*T_B)/O$ where T represents the temperature of the thermal pixel, B represents the background area, O represents the subject area, and $T_B$ represents the background temperature.

9. The system of claim 3, wherein one thermal pixel of the thermal image covers a first subject under test and a second subject under test, a second subject area $O_{B1}$ corresponding to the second subject under test is smaller than a first area $O_{A1}$ corresponding to the first subject under test, and a second subject temperature corresponding to the second subject under test is set to a subject temperature in an adjacent thermal pixel covering only the second subject under test, relationship of which being expressed as follows:
$T=(G1*T_{G1}+O_{A1}*T_{OA1}+O_{B1}*T_{OB1})/(O_{A1}+O_{B1}+G1)$
where $T_{OA1}$ represents first subject temperature corresponding to the first subject under test, T represents the temperature of the thermal pixel, G1 represents the background area, and $T_{G1}$ represents the background temperature.

10. A thermal image processing method, comprising:
(a) capturing a visual image and a thermal image of at least one subject under test; and
(b) fusing the thermal image with the visual image to result in a fused image, and determining an area of the subject under test and accordingly obtaining subject temperature of the subject under test;
wherein the step (b) comprises:
(b1) determining a subject area and a background area in a single thermal pixel of the fused image; and
(b2) compensating temperature of the thermal pixel to obtain the subject temperature;
wherein a weighted sum of the subject temperature and background temperature with weights of corresponding area percentage is equal to temperature of the thermal pixel.

11. The method of claim 10, wherein the subject area corresponding to a region of the subject under test and the background area corresponding to a region other than the subject under test; and
compensating the temperature of the thermal pixel according to the subject area, the background area and the background temperature.

12. The method of claim 11, wherein the step (b1) comprises:
determining a subject contour of the subject under test in the visual image;
fusing the thermal image with the visual image; and
determining the subject area and the background area in the thermal pixel according to the subject contour.

13. The method of claim 11, before obtaining the subject temperature, further comprising:
estimating to obtain the background temperature.

14. The method of claim 13, wherein the step of estimating to obtain the background temperature comprises:
obtaining the background temperature according to temperature of one thermal pixel or average temperature of plural thermal pixels of an additionally captured thermal image containing no subject under test.

15. The method of claim 13, wherein the step of estimating to obtain the background temperature comprises:
obtaining the background temperature according to temperature of one thermal pixel covering no subject under test of the thermal image.

16. The method of claim 11, wherein the subject temperature To is expressed as follows:
$T_o = (T*(B+O) - B*T_B)/O$ where T represents the temperature of the thermal pixel, B represents the background area, O represents the subject area, and $T_B$ represents the background temperature.

17. The method of claim 11, wherein one thermal pixel of the thermal image covers a first subject under test and a second subject under test, a second subject area $O_{B1}$ corresponding to the second subject under test is smaller than a first subject area $O_{A1}$ corresponding to the first subject under test, and a second subject temperature $T_{OB1}$ corresponding to the second subject under test is set to a subject temperature in an adjacent thermal pixel covering only the second subject under test, relationship of which being expressed as follows:
$T = (G1*T_{G1} + O_{A1}*T_{OA1} + O_{B1}*T_{OB1})/(O_{A1} + O_{B1} + G1)$
where $T_{OA1}$ represents first subject temperature corresponding to the first subject under test, T represents the temperature of the thermal pixel, G1 represents the background area, and $T_{G1}$ represents the background temperature.

* * * * *